United States Patent [19]

Nakano et al.

[11] Patent Number: 5,236,519
[45] Date of Patent: Aug. 17, 1993

[54] METHOD FOR LUBRICATING TREATMENT OF ALUMINUM

[75] Inventors: Shigeru Nakano, Fukuoka; Yoichi Nishimura, Nakama, both of Japan

[73] Assignee: Nihon Parkerizing Co., Ltd., Tokyo, Japan

[21] Appl. No.: 641,595

[22] Filed: Jan. 15, 1991

[30] Foreign Application Priority Data

Jan. 18, 1990 [JP] Japan .................................. 2-7136

[51] Int. Cl.$^5$ ...................... C23C 22/78; C23C 22/12
[52] U.S. Cl. ..................................... 148/246; 148/262
[58] Field of Search ............................. 148/246, 262

[56] References Cited

U.S. PATENT DOCUMENTS 4,808,278  2/1989  Roberts .............................. 205/197
4,944,813  7/1990  Hoseman ............................ 148/246

FOREIGN PATENT DOCUMENTS 0204887  10/1985  Japan .................................. 148/262
2175611  12/1986  United Kingdom ................ 148/246

OTHER PUBLICATIONS

Dubbel, Taschenbuch fur den Maschimenbau, Springer-Verlag, Berlin, Heidelberg, New York, Tokyo, 15th Edition, 1983, ISBM 3-54012418-7, pp. 302, 303.

*Primary Examiner*—Sam Silverberg
*Attorney, Agent, or Firm*—Ladas & Parry

[57] ABSTRACT

There are disclosed a method for lubricating treatment of an aluminum surface comprising subjecting the surface of aluminum or aluminum alloy to chemical zinc deposition plating, then to a treatment with a phosphating solution and further to a lubricating treatment, and a method for lubricating treatment of an aluminum surface comprising subjecting the surface of aluminum or aluminum alloy to chemical zinc deposition plating in a thickness of 0.2 μm or more and further to a soap lubricating treatment.

3 Claims, No Drawings

METHOD FOR LUBRICATING TREATMENT OF ALUMINUM

BACKGROUND OF THE INVENTION

The present invention relates to a method for forming a lubricating film on a surface of aluminum or aluminum alloy (hereinafter abbreviated as "aluminum etc.") at the time of subjecting said aluminum etc. to cold forging, drawing and the like.

Phosphate film is widely used as a lubricating film in cold forging or such of steel and nonferrous metals.

Formation of phosphate film on aluminum etc. has so far been performed by using, for example, a solution of the following composition: $Zn^{2+}$:0.7%, $PO_4^{3-}$:1.0%, $NO_3^-$:2.0%, $BF_4^-$:1.0%. However, when aluminum etc. are treated with this solution, the situation of film formation changes in a short period, so that it has been difficult to form a desired phosphate film in a stable manner. In order to form the phosphate film stably it has so far been practiced to renew the solution frequently. However, the disposal of the waste liquor of the solution, which contains fluorides, is troublesome.

An object of the present invention is to provide a method for stably forming a lubricating film suited to cold forging or such on aluminum etc. without the need of frequent renewal of treating solution. Further, the present invention discloses a method for forming a lubricating film on aluminum etc. by using a treating solution whose waste liquor can be easily disposed.

The present inventors have made extensive study to find the reason why the situation of phosphate film formation changes in a short period as described above in the previous method of lubricating treatment, and as a result have made the following findings.

i) When aluminum etc. are treated in a phosphating solution containing no fluoride the metal surface is coated by inactive oxide film or hydrated oxide film, which makes the formation of phosphate film largely impossible.

ii) When a fluoride is incorporated into the solution, the inactive oxide film and hydrated oxide film are activated by a fluoride and the film layer of phosphate is formed. At this time, however $Al^{3+}$ ions dissolve out into the treating solution and remain therein.

iii) The $Al^{3+}$ ions are gradually accumulated in the phosphating solution and come to inhibit the formation of phosphate film. Therefore, the solution containing accumulated $Al^{3+}$ ions can hardly reproduce the situation of phosphate film formation as desired even when the concentrations of the other ingredients are adjusted by replenishment of chemicals.

As described above, a treating solution containing a fluoride is naturally used in order to form phosphate film directly on the surface of aluminum etc. However, with the treating solution containing a fluoride, the situation of phosphate film formation becomes unstable in a short period.

The present inventors have made further study on the method for forming phosphate film layer on aluminum etc. and as a resultantly attained the following findings.

iv) When aluminum etc. are subjected beforehand to chemical zinc deposition plating, phosphate film layer can be formed stably on the aluminum etc. irrespective of whether the phosphating solution contains fluorine or not.

v) When chemical zinc deposition plating is applied beforehand, no dissolution nor accumulation of $Al^{3+}$ ions in the solution takes place, and the situation of phosphate film formation is maintained as desired in a stable manner even when the solution is repeatedly used over a long period.

SUMMARY OF THE INVENTION

The present invention has been achieved on the basis of the above findings.

According to the first present invention, there is provided a method for lubricating treatment of an aluminum surface comprising subjecting the surface of aluminum of aluminum alloy to chemical zinc deposition plating, then to a treatment with a phosphating solution and further to a lubricating treatment.

According to the second present invention, further, there is provided a method for lubricating treatment of an aluminum surface comprising subjecting the surface of aluminum or aluminum alloy to chemical zinc deposition plating in a thickness of 0.2 μm or more and then to a soap lubricating treatment.

DETAILED DESCRIPTION OF THE INVENTION

The term "aluminum or aluminum alloy" used in the first and second present inventions refers to pure aluminum and aluminum alloys comprising aluminum as the main component, which include, for example, pure aluminum including 1S and 2S, corrosion resisting aluminum-magnesium base alloys including 52S and 56S, aluminum-manganese base alloys including 3S, aluminum-magnesium alloys including 61S and 63S, duralumins including 14S, 17S and 24S, and extra super duralumins including 74S and 75S. The present invention may be applied to any of the various kinds of aluminum etc. mentioned above.

In the first step of the methods of the first and second present inventions, the surface of aluminum etc. is subjected to chemical zinc deposition plating. The "chemical zinc deposition plating" referred to in the present invention means the zinc plating attained by the so-called zincate process, wherein aluminum etc. are immersed, for example, in an alkaline sodium zincate solution. For example, when aluminum etc. whose surface has been degreased and cleaned are immersed in a solution containing 52 g/l of $Na_2O$ and 200 g/l of ZnO dissolved therein at room temperature for about 1 minute, a thin zinc plating layer of about 0.5 μm thickness is formed on the surface of aluminum etc. Since the zinc plating layer thus formed is very thin, it has hardly any function of protecting the aluminum surface, and has not been used previously as a lubricating film for aluminum etc. Thus far, chemical zinc deposition plating has been widely used as an undercoat plating when plating of other metals, e.g. nickel or copper, is applied onto aluminum etc. After the surface of aluminum etc., has been coated with a zinc layer of uniform thickness of about 0.1 μm, the rate of zinc deposition becomes slow. Though a thicker zinc plating can be formed further, the resulting zinc layer tends to become spongy with non-uniform thickness. In a later step of the present invention, a zinc phosphate film is further formed on the zinc plating layer. If the zinc layer is spongy at the time, the adhesion of the zinc phosphate film becomes poor. Accordingly, in the first present invention, a zinc layer of a uniform thickness of about 0.1 μm is preferred. Such a zinc layer can be easily formed as described above.

Though the chemical zinc deposition plating of the present invention was explained with reference to a solution containing 52 g/l of $Na_2O$ and 200 g/l of ZnO as an example, the chemical zinc deposition plating layer used in the present invention may be formed also by other methods. For example, Japanese Patent Application Kokoku (Post-Exam. Publn.) No. 40-6721, which relates to a zinc deposition plating used as an undercoat for a metal plating, uses a solution containing 100-700 g/l of an alkali metal hydroxide, 10-200 g/l of zinc oxide, and 1-200 g/l of an alkali metal gluconate. Also by this method, a zinc plating layer suited to forming a zinc phosphate film can be obtained.

As described above, the chemical zinc deposition plating layer used in the present invention can be easily formed by various methods known to the art. Accordingly, the present invention is not particularly limited to the method of forming a chemical zinc deposition plating layer.

In the second step of the method of the first present invention, the aluminum etc., subjected to chemical zinc deposition plating are further subjected to phosphating. The phosphating solution used in this step may be, for example, those which are used in forming zinc phosphate film on the surface of steel, e.g., an aqueous phosphating solution containing 6–10 g/l of $Zn^{2+}$, 10–20 g/l of $PO_4^{3-}$ and 3–50 g/l of $NO_3^-$ as the main components and optionally containing 1–5 g/l of $Ca^{2+}$ and 0.05–0.5 g/l of Ni. As described before, when aluminum etc. are immersed in a zinc phosphate treatment solution containing no fluorine compound, no zinc phosphate film can be formed. In the first present invention, aluminum etc. coated by a chemical zinc deposition plating layer are, for example, immersed in a phosphating solution. In the present invention, therefore, the phosphating solution comes into contact not with aluminum etc., but with the chemical zinc deposition plating layer, so that a phosphate film is formed on the chemical zinc deposition plating layer. Through said second step, a phosphate film having a sufficient thickness as a lubricating film is formed on the surface of aluminum etc., through the medium of the chemical zinc deposition plating layer. The phosphate film thus formed shows a good adhesion to aluminum etc., and functions as a good lubricating film for cold forging and drawing.

As described above, a conventionally used phosphating solution is employed in the first present invention. Further, the phosphating solution does not directly contact and react with aluminum etc. According to the method of the present invention, therefore, no dissolution nor accumulation of $Al^{3+}$ ions in the phosphating solution takes place to change the situation of phosphate film formation, and a desired phosphate film can be formed stably. In the present invention, further, the conditions for film formation can be stabilized as desired over a long period of time by adjusting the composition of the phosphating solution through replenishment of chemicals without causing gradual accumulation of $Al^{3+}$ ions in the phosphating solution or causing inhibition of phosphate film formation by accumulated $Al^{3+}$ ions, so that frequent renewal of the solution is unnecessary. Further, phosphating solutions containing no fluorine may also be used in the first present invention, so that the disposal of waste liquid and waste water can be greatly simplified.

In the third step of the method of the first present invention, a lubricating treatment is applied to aluminum etc., having phosphate film formed thereon. In cold forging and drawing, various lubricating treatments are applied after a phosphate film has been formed, which include a treatment of immersion in a soap solution followed by drying, a treatment of coating soap powders, and coating of lubricating oil. The lubricating treatment serves to lower the frictional resistance between the working tool and the work piece, thereby to facilitate the working and lengthen the life of the tool. The aluminum etc. having phosphate film formed thereon according to the present invention can be processed by various lubricating treatments known to the art. Such lubricating treatments provide the same effect as that obtainable by the prior art methods.

According to the second present invention, chemical zinc deposition plating is applied onto aluminum etc., in a thickness of 0.2 μm or more and then a soap lubricating treatment is applied directly onto the chemical zinc deposition plating layer without application of a phosphating treatment.

The present inventors have applied chemical zinc deposition platings of varied thicknesses onto aluminum etc., then applied a soap lubricating treatment directly thereonto without application of a phosphating treatment, and examined the lubricating of the treated surfaces in cold forging and drawing. As a result it has been found that when the chemical zinc deposition plating layer has a thickness of less than 0.2 μm the lubricity is insufficient, causing the seizure of the metal with tools etc., whereas when a chemical zinc deposition plating layer 0.2 μm or more in thickness is formed, it will, coupled with soap lubrication, give an excellent lubricating film.

Forming a chemical zinc deposition plating in a thickness of 0.2 μm or more on aluminum etc., may be performed, for example, by the following method. Usually a chemical zinc deposition plating layer of a thickness of 0.2 μm or more has a porous surface. In the second present invention, however, even when the surface of the zinc plating layer is porous, it will given an excellent lubricating film when a soap lubricating treatment is applied to the zinc plating layer. Japanese Patent Application Kokoku (Post-Exam. Publn.) No. 60-15702 relates to a method of chemical zinc deposition plating for improving the corrosion resistance of aluminum etc., and discloses a method for forming a dense and thick zinc plating layer. Said patent application relates to a method for forming a nonporous, dense plating layer and teaches nothing of the technique of utilizing the zinc deposition plating layer as a lubricating film in cold forging etc. However, the dense film thus obtained also forms an excellent lubricating film when soap lubrication is applied thereto. The soaps which may be used in the soap lubrication may be those of alkaline or alkaline earth metals, sodium soaps being particularly preferred.

According to the finding of the present inventors, these chemical zinc deposition plating layers show a good adhesion to aluminum etc., and give, those having a porous surface in particular, a lubricating film suited to cold forging and drawing when subjected further to a soap lubricating treatment.

PREFERRED EMBODIMENTS

Example

Phosphate films were formed on pure aluminum bars (50 mm in diameter and 1,000 mm in length) according to the following process steps. In Nos. 1 and 2 of Table 1, which refer to comparative examples using conventional methods, the pure aluminum base were immersed in a 30 g/l solution of Fine Cleaner #315 (a trade name of a weakly alkaline cleaner, mfd. by Nihon Parkerizing Co., Ltd.) at 70° C. for 10 minutes, then washed, immersed in a phosphating solution containing a fluoride at 100° C. for 5 minutes, and washed with water. In No. 1, the phosphating solution used was that immediately after renewal and had a low concentration of $Al^{3+}$, enabling a phosphate film to be formed by immersion of 5 minutes. In No 2, the phosphating solution used was that which had been used to form phosphate film on 1,000 pure aluminum bars mentioned above with 1 m$^3$ of the solution and then whose concentrations of $Zn^{2+}$, $PO_4^{3-}$, $NO_3^-$ and $BF_4^-$ were adjusted by replenishment of chemicals.

film under the same conditions as in No. 3 of Table 1, wherein a solution immediately after renewal was used.

In No. 5 of Table 1, which refers to a comparative example, the same chemical zinc deposition plating as that in No. 3 of Table 1 was applied but the succeeding phosphating treatment was omitted and only a zinc plating layer of about 0.1 μm thickness was formed on the aluminum bar surface. In No. 6 of Table 1, which refers to an example of the second present invention, a thick zinc plating layer of 0.2 μm thickness was formed according to the method described before relating to the second present invention, and the phosphating treatment was not applied thereafter.

In Nos. 1 to 6 of Table 1, the aluminum bars, after subjected to a soap lubricating treatment, were worked

TABLE 1

|  | No. | Chemical zinc deposition thickness (μm) | Phosphating solution composition (wt %) | | | | | Formation of phosphate film*1) | Lubricating treatment sodium soap base (g/l) | Lubricating in cold working*2) |
| --- | --- | --- | --- | --- | --- | --- | --- | --- | --- | --- |
|  |  |  | $Zn^{2+}$ | $PO_4^{3-}$ | $NO_3^-$ | $BF_4^-$ | $Al^{3+}$ |  |  |  |
| Comparative example | 1 | None | 0.7 | 1.0 | 2.0 | 1.0 | 0 | ○ | 70 | ○ |
| Comparative example | 2 | None | 0.7 | 1.0 | 2.0 | 1.0 | 0.05 | X | 70 | X |
| Example in the first present invention | 3 | 0.1 | 0.7 | 1.0 | 2.0 | — | 0 | ○ | 70 | ○ |
| Example in the first present invention | 4 | 0.1 | 0.7 | 1.0 | 2.0 | — | 0 | ○ | 70 | ○ |
| Comparative example | 5 | 0.1 | — | — | — | — | — | — | 70 | X |
| Example in the second present invention | 6 | 0.2 | — | — | — | — | — | — | 70 | ○ |

Note
*1)Good (Dark gray), X: Poor (color of the original material) (Judged by visual observation of the surface)
*2)Good, X: Poor As can be seen from Table 1, since the treating solution of No. 2 contained accumulated $Al^{3+}$ ions, a satisfactory phosphate film could not be formed with immersion of 5 minutes. Therefore, the treating solution of No. 2 must be renewed to obtain a satisfactory result, but since the treating solution contains a fluoride the disposal of the waste liquor is complicated.

In Nos. 3 and 4, which refer to examples according to the first aspect of the present invention, the pure aluminum bars were immersed in a 30 g/l solution of Fine Cleaner #315 at 70° C. for 10 minutes, then washed, and a chemical zinc deposition plating was applied thereto by immersing the bars in a 250 g/l Pre Coat T (mfd. by Nihon Parkerizing Co., Ltd., NaOH:25%, $Zn^{2+}$:5%) solution at room temperature for 10 minutes, whereby a zinc plating layer of about 0.1 μm thickness was formed. The aluminum base subjected to the chemical zinc deposition plating were washed with water and further immersed in a phosphating solution for 5 minutes. The phosphating solution used in No. 3 was that immediately after renewal. The phosphating solution used in No. 4 was that which had been used to form phosphate film on 1,000 pure aluminum bars with 1 m$^3$ of the solution and then whose composition was adjusted by replenishment of chemicals. According to the method of the present invention, as can be seen in No. 4 of Table 1, the phosphating solution contains no $Al^{3+}$ ion even after used for forming phosphate film on a large quantity of aluminum, and could form phosphate into bars of 42 mm diameter by drawing. The soap lubricating treatment was performed by immersing the bar in a 70 g/l solution of PALUBE #235 (the trade name of a lubricant containing sodium soap as the main component, mfd. by Nihon Parkerizing Co., Ltd.) at 80° C. for 5 minutes. The results of examination of lubricating in the drawing operation are shown in Table 1.

As can be seen from Table 1, in Nos. 3, 4 and 6, which refer to the method of the present invention, the same excellent lubricity is exhibited as in No. 1, which refers to the prior art method. On the other hand, seizure of the material with the tool occurred and the surface of the material was wounded in No. 2 of a comparative example owing to insufficient formation of phosphate film, and in No. 5 of a comparative example because the lubricating film was a thin zinc plating layer.

According to the present invention, a lubricating film suited to cold forging and drawing can be formed stably at all times on the surface of aluminum etc. Further, according to the present invention, the solution used for forming the lubricating film can be employed over a long period without the need of frequent renewal. According to the present invention, since a lubricating film forming solution containing no fluoride can also be used, the waste liquid disposal and the waste water disposal can be performed in a simple manner.

What is claimed is:

1. In a process for forming a lubricating film on aluminum or aluminum alloy wherein a surface of aluminum or aluminum alloy is treated with a phosphating solution to form a lubricating film thereon, the improvement comprising carrying out chemical zinc deposition plating in a thickness of about 0.1 μm prior to the treatment of said surface with said phosphating solution, said phosphating solution being formed without the addition of fluorine.

2. A process as claimed in claim 1, wherein the phosphating solution is an aqueous solution consisting essentially of $Zn^{2+}$, $PO_{x4}-$ and $NO_3^-$.

3. A process as claimed in claim 1, further comprising cold forging said surface.

* * * * *